No. 865,011. PATENTED SEPT. 3, 1907.
R. BRUN.
CONNECTION SYSTEM FOR DIRECT CURRENT ELECTRIC MOTORS.
APPLICATION FILED FEB. 28, 1906.
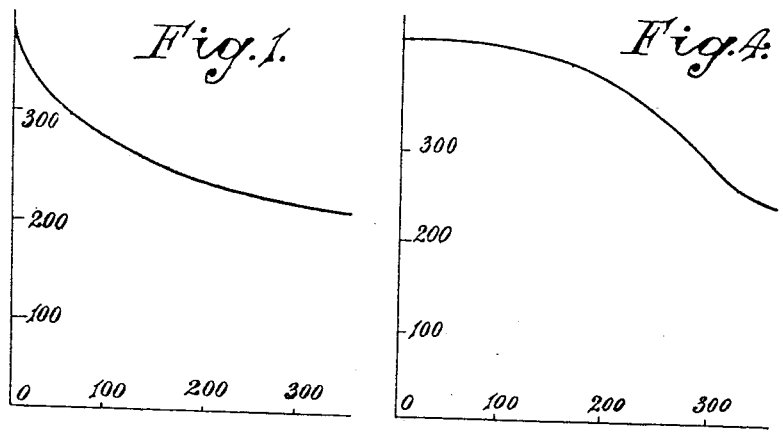
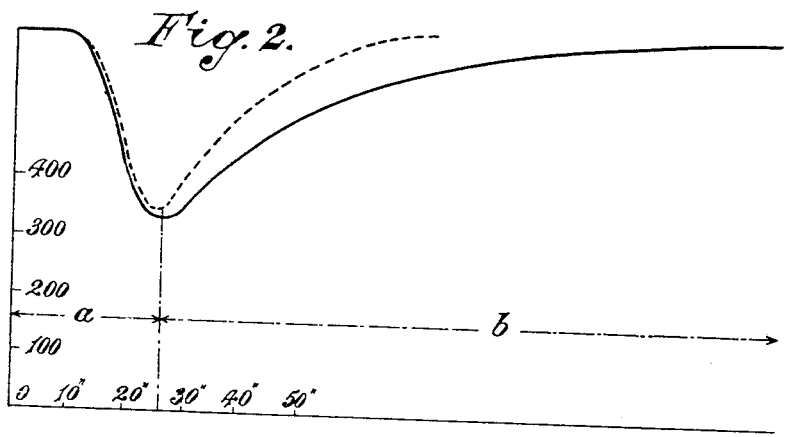
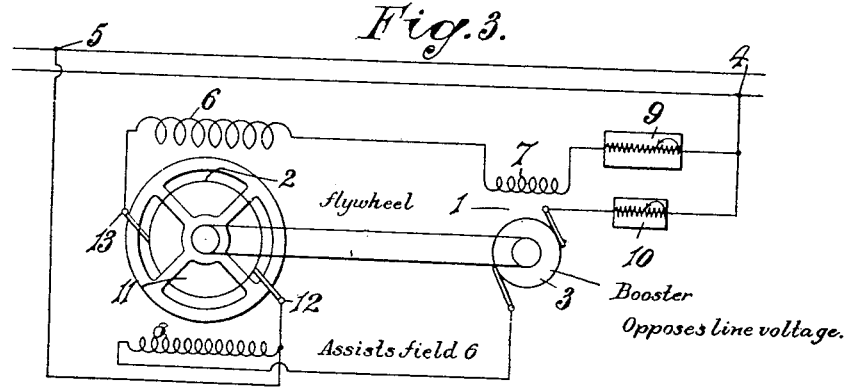
WITNESSES:
Otto J. Schairer
Birney Hines
INVENTOR.
Raoul Brun
by Wesley G. Carr attorney

UNITED STATES PATENT OFFICE.

RAOUL BRUN, OF HAVRE, FRANCE.

CONNECTION SYSTEM FOR DIRECT-CURRENT ELECTRIC MOTORS.

No. 865,011.　　　　Specification of Letters Patent.　　　　Patented Sept. 3, 1907.

Application filed February 28, 1906. Serial No. 303,339.

*To all whom it may concern:*

Be it known that I, RAOUL BRUN, a citizen of the Republic of France, and a resident of Havre, France, have invented a new and useful Improvement in Connection Systems for Direct-Current Electric Motors, of which the following is a specification.

This invention relates to electric motors operated by direct current, and particularly to such motors when employed to operate under an intermittent load.

In order to reduce the power of any motor used for intermittent service and to regulate its operation, it is advantageous to provide it with a fly wheel unless the motor is to be stopped between successive active periods because of the length of the period of inaction being long and because it is desired to reverse the direction of rotation. The fly wheel acts as a reservoir of kinetic energy, such energy being stored when the speed of operation exceeds the normal and being given up from the mass of the fly wheel at any decrease of speed from the normal.

In the case of a direct current, compound-wound motor, the speed of the motor will, for a given voltage, depend upon its load, the armature revolving at such a speed below the normal no-load speed for that motor as will produce a counter electromotive force sufficiently less than the service voltage to allow sufficient current to pass through the armature to provide the required torque corresponding to that load. At heavy loads, however, an increase in load on the motor, causing an increase of current in the series field winding, will not produce much decrease of speed. It follows, therefore, that, at light loads, a very small increase of load causes a considerable diminution in speed but, at heavy loads, a large increase in the load causes only a comparatively small decrease in speed. If such a motor be provided with a fly wheel and be connected to operate apparatus constituting intermittent loads such, for example, as rolling mills, shears and the like, during the inactive periods, the speed of the motor will increase and, if the periods be long enough, will rise to the no-load speed of the motor, thus storing a certain amount of energy in the fly wheel (the no-load speed being that speed at which only sufficient energy is absorbed by the motor to supply its losses and mechanical friction).

When the active period commences, the energy is almost entirely supplied by the fly wheel, since the motor is not giving out much energy and cannot do so until a considerable reduction in speed has taken place, as stated above. At the end of the active period, the speed has become reduced and, therefore, a certain amount of kinetic energy will have been supplied from the fly wheel. During the next inactive period, the motor is engaged in restoring the fly wheel to its original speed but, since the torque exerted by the motor tending to accomplish this decreases as the speed approaches the original speed, the time taken to effect complete restoration of speed to the fly wheel will be considerable. Therefore, unless the inactive periods are sufficiently long to allow of this, the fly wheel will never regain its original speed and will thus constitute a considerably smaller reservoir of kinetic energy in proportion to its mass than if it were operated at the speed at which the motor was rotating at the commencement of the first operation. This action of the motor alone and the combination of the motor and fly wheel on an intermittent load may be clearly understood from a consideration of the curves given in the accompanying drawings, of which Figure 1 is a current-speed curve showing the difference in rate of variation of speed and load in a compound-wound motor at different loads, the vertical scale representing speed in revolutions per minute and the horizontal scale representing current in amperes. Fig. 2 shows, in full lines, the variation in speed of a compound-wound motor connected to a fly wheel and arranged to operate an intermittent load, such variation being indicated at different instants in a cycle of operation which consists of an active period followed by an inactive period, the vertical scale representing speed in revolutions per minute and the horizontal scale representing time in seconds. Fig. 3 is a diagram of machines and circuits combined and arranged in accordance with my invention, and Fig. 4 is a curve diagram similar to Fig. 1 and showing the effect of my invention upon the current-speed curve of the motor.

During the active period, indicated at $a$ in Fig. 2, the speed decreases rapidly and the energy is supplied mainly by the fly wheel. During the inactive period $b$, the speed gradually increases, the motor being engaged in restoring kinetic energy to the fly wheel. It will be noticed from this curve that the rate of increase of speed in a given interval of time (say per second or per minute) becomes less as the ultimate speed attained by the motor at the end of the inactive period is approached.

The object of the present invention is to obviate the disadvantage mentioned above and to cause the variation of the speed of the motor, with change of load, to be greatest with large loads and, at the same time, to preserve the necessary features for practical application, namely, limitation of the maximum speed, automatic variation of the speed with load and absence of any undesirable devices such as mechanically operated rheostats and the like. With this object in view, according to the present invention, a booster is provided, one armature terminal of which is connected to one terminal of the shunt winding of the compound-wound motor which is provided with a fly wheel and the speed of which is to be regulated in such a way that the voltage produced by the booster tends to reduce the shunt excitation of the motor. This booster is driven mechanically from the shaft of the motor and its field magnet is excited by the total current supplied to the latter.

Referring now to Fig. 3, the booster 1 is arranged to be mechanically driven by a compound-wound motor 2, the series field winding 6 of the motor being connected, through the field winding 7 of the booster and a rheostat 9, to one terminal 4 of the source of supply, and the shunt winding 8 of the motor being connected to the same terminal 4 through the armature 3 of the booster and a rheostat 10. The terminal 12 of the armature 11 which is connected to the shunt winding 8 is also connected to the terminal 5 of the source of supply, the other armature terminal 13 being connected to the series winding 6. The electromotive force of the booster 1 is opposed to that of the source of supply and its effect is therefore to diminish the shunt excitation when the load increases, and therefore to increase the speed above what it would be if there were no booster; conversely, it has the effect of increasing the shunt excitation when the load diminishes. In order that the booster may act in this manner, the effect of the field winding 7 upon its voltage should preponderate over the effect of variations in speed upon its voltage; that is, the field strength of the booster should increase at such a rate, with increase of load upon the motor, that the voltage of the booster will be caused to increase notwithstanding the diminution in speed that might be caused by the increased load upon the motor, and the reverse conditions should also be true. The field magnet windings 6 and 8 of the motor are arranged to assist each other, and their respective ampere turns are so calculated that when the load on the motor increases the diminution in the excitation of the winding 8, owing to the action of the booster, is compensated by the increased excitation due to the winding 6.

For very heavy loads, this increase of the excitation of the winding 6 becomes much more important than the diminution of excitation of the winding 8, which explains why the current-speed curve (Fig. 4) is first horizontal and then bends down for the very heavy loads.

Since the reduction of the shunt field excitation for an increase of load is greatest for light loads on the motor, the resulting rapid increase of speed at light loads will tend to neutralize the rapid reduction of speed with an increase of load on account of the above mentioned characteristics of the motor 2.

The curve connecting speed and time for a motor provided with a booster, as above described, is shown in dotted lines in Fig. 2 and, by comparing this with the full line curve, the advantage of this system will be clearly understood. In this way, it is evident that any desired speed regulation between no-load and the greatest possible load can be obtained.

I claim as my invention:

1. The combination of a compound-wound motor provided with a fly wheel, and an auxiliary dynamo-electric machine the speed of which is arranged to vary directly with that of the motor, the armature of the auxiliary machine being connected in series with the shunt field winding of the motor so that the voltage of the said machine is opposed to that of the source of supply and the field winding of the auxiliary machine being connected with the series winding of the motor.

2. The combination with a compound-wound motor provided with a fly wheel, and a supply circuit, of an auxiliary dynamo-electric machine mechanically coupled to said motor and having its armature so connected to the supply circuit in series with the shunt winding of the motor as to reduce the shunt excitation with increasing loads.

3. The combination with a compound-wound motor provided with a fly wheel, and a supply circuit, of an auxiliary dynamo-electric machine mechanically coupled to said motor and having its armature winding so connected to the shunt field magnet winding of the motor as to diminish the shunt excitation as the load increases and to increase said excitation as the load diminishes.

4. The combination with a dynamo-electric machine having armature and shunt and series field magnet windings, of a fly wheel and a booster coupled to the said machine, the booster having armature an dfield magnet windings that are connected in series, respectively, with the shunt field magnet and armature windings of the said machine.

In testimony whereof, I have hereunto subscribed my name this 15th day of February 1906.

RAOUL BRUN.

Witnesses:
E. DERFORGES,
FOURCADE.